United States Patent [19]

Courtright et al.

[11] 4,284,240
[45] Aug. 18, 1981

[54] WATER PROPELLED PRIME MOVER IN AGRICULTURAL IRRIGATION SYSTEMS

[76] Inventors: Burr Courtright, Rte. 1, Box 1685, La Grande, Oreg. 97850; Dale E. Olson, 2143 E. Tenth St., Fremont, Nebr. 68025; Alvin H. Smolkowski, Rte. 3, Box 3190, La Grande, Oreg. 97850

[21] Appl. No.: 729,994

[22] Filed: Oct. 6, 1976

[51] Int. Cl.³ .............................................. B05B 3/18
[52] U.S. Cl. .................................... 239/184; 239/711; 239/716
[58] Field of Search ............... 137/344; 239/177, 212, 239/213, 184, 711, 716

[56] References Cited

U.S. PATENT DOCUMENTS

| | | | |
|---|---|---|---|
| 2,941,727 | 6/1960 | Zybach | 239/212 X |
| 3,385,315 | 5/1968 | Decoto et al. | 137/344 |
| 3,444,941 | 5/1969 | Purtell | 137/344 X |
| 3,744,514 | 7/1973 | Stafford | 137/344 |
| 3,848,625 | 11/1974 | Courtright | 137/344 |
| 3,980,098 | 9/1976 | Courtright | 137/344 |
| 4,006,860 | 2/1977 | Cornelius | 239/212 |

FOREIGN PATENT DOCUMENTS

217436  5/1958  Australia .............................. 239/177

*Primary Examiner*—Gerald A. Michalsky
*Attorney, Agent, or Firm*—Parmelee, Miller, Welsh & Kratz

[57] ABSTRACT

A water-propelled prime mover in and for agricultural irrigation systems. The hose to be coupled to and pulled by the prime mover, to supply water under pressure for irrigation purposes, also supplies water pressure for torquing the wheel line of the irrigation system and for advancing the prime mover, through its capstan revolvement, along an anchored cable, stretched over an intended course of travel. Means are provided to sense and utilize deflections of the wheel line, and also to control prime mover propulsion and wheel-line torque; further, to relate and vary the relationship of wheel line revolvement and prime mover advance, depending upon line conditions, so that the line and prime mover travel in proper mutual orientation.

43 Claims, 11 Drawing Figures

WATER PROPELLED PRIME MOVER IN AGRICULTURAL IRRIGATION SYSTEMS

FIELD OF INVENTION

The present invention relates to agricultural equipment and, more particularly, to prime movers for advancing irrigation structures such as wheel lines across a given agricultural field.

More specifically, the present invention provides independently reciprocating hydraulic means for turning, respectively, a capstan and also a torquing gear whereby the capstan can advance the prime mover, by virtue of the capstan incorporating a wound cable stretched and anchored over a given field. The torquing mechanism, on the other hand, is keyed to a transverse conduit coupler which is constructed to connect to the central conduit of an external wheel line, for drive-torquing the same. Means are provided herein to permit prime mover travel and wheel line revolvement to mutually track, and to compensate for any leads or lags in the wheel line, coupled to the prime mover relative to its intended normal or 90° disposition.

DESCRIPTION OF PRIOR ART

The following U.S. patents are known and incorporated herein:

| | | | |
|---|---|---|---|
| 1,658,202 | 3,143,298 | 3,545,478 | 3,807,638 |
| 2,122,596 | 3,272,438 | 3,592,220 | 3,848,625 |
| 2,730,403 | 3,312,236 | 3,603,508 | 3,848,805 |
| 2,892,466 | 3,386,661 | 3,628,731 | 3,856,039 |
| 3,002,697 | 3,516,609 | 3,766,937 | 3,980,098* |
| 3,043,520 | | | |

*not prior art

None of these teach the present invention as claimed.

BRIEF DESCRIPTION OF THE INVENTION

In general, there is provided herein a water propelled prime mover in agricultural irrigation systems wherein said prime mover constitutes a wheel-supported frame provided with a transverse journaled conduit. Such conduit is constructed for connection to a pressure hose and carries a fixed ratchet wheel and also a freely journaled capstan. The ratchet wheel and capstan are independently driven by independent levers carrying pawl mechanisms. These levers are individually hydraulically actuated, up and down, to provide for the periodic rotational displacement of the capstan and ratchet wheel. The capstan is provided with a wound cable that has its opposite ends constructed for anchoring to terrain over which the prime mover is to travel. Accordingly, revolvement of the capstan "pulls along" the prime mover, along the cable, to approach a forward anchored end thereof. The ratchet wheel, when driven, is operative to revolve the transverse tubular conduit of the prime mover frame and also, therefore, the wheel line structure operatively coupled thereto. Valving means with wheel-line deflection sensing means are provided to effectively relate the capstan with the ratchet wheel of the prime mover frame, and also to provide speed control and variability so as to meter, appropriately, fluid to the hydraulic structure actuating the levers, thereby to compensate for lead and lag periods of the wheel line relative to the prime mover. This operates to keep the line straight and in normal or 90° relationship relative to the prime mover.

Specifically, in the present invention a wheel-supported frame incorporates a transverse journaled conduit constructed for connection to a pressure line and also for direct connection to that central conduit of an agricultural wheel line irrigation system wherein such central conduit is to be torque-driven in order to advance the wheel line and the wheels thereof carrying the central conduit over such field.

In contrast with prior art systems, the present prime mover is advanced by both a capstan and also by means for torquing the central conduit of a wheel line. Such an arrangement measurably increases the pulling power of the prime mover, which does not restrict the pulling of the pressure line to available traction at the wheels; rather, there is a power advance in the capstan supplied.

Valving mechanisms are employed for metering fluid flow to independent hydraulic actuators supplied the frame. Such actuators reciprocate, up and down, levers that are mechanically coupled to the capstan and also to the ratchet wheel that torques the central conduit of the prime mover.

In the event that there is a misalignment, i.e. lead or lag of a portion of the wheel line proximate to the prime mover, then valving with appropriate means are provided whereby to retard or advance, as necessary, the movement of the capstan relative to the torquing of the frame's transverse conduit so as to tend to bring the wheel line back into a normal or 90° relationship relative to the prime mover frame and the direction in which it is advancing.

OBJECTS

Accordingly, a principal object of the invention is to provide a new and improved prime mover for irrigation systems.

A further object of the invention is to provide a new and improved prime mover of the type described incorporating both wheel line torquing and also a capstan revolvement in order to propel a prime mover and its wheel line forwardly.

A further object of the invention is to provide a prime mover for side-roll type wheel lines wherein there is included means for automatically sensing leads and lags of the wheel line relative to the prime mover, this in order that capstan speed and also the line torquing can be adjusted to straighten the line, i.e. to permit the wheel line to catch up to or be retarded toward its intended position.

A further object of the invention is to provide a side-roll wheel-line prime mover wherein independent hydraulic means are employed for actuating both capstan and wheel line torquing means, with valving means being supplied for regulating and adjusting fluid flow as needed to such hydraulic means.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

DESCRIPTION OF PREFERRED EMBODIMENTS

Figures 1, 1A, 1B:
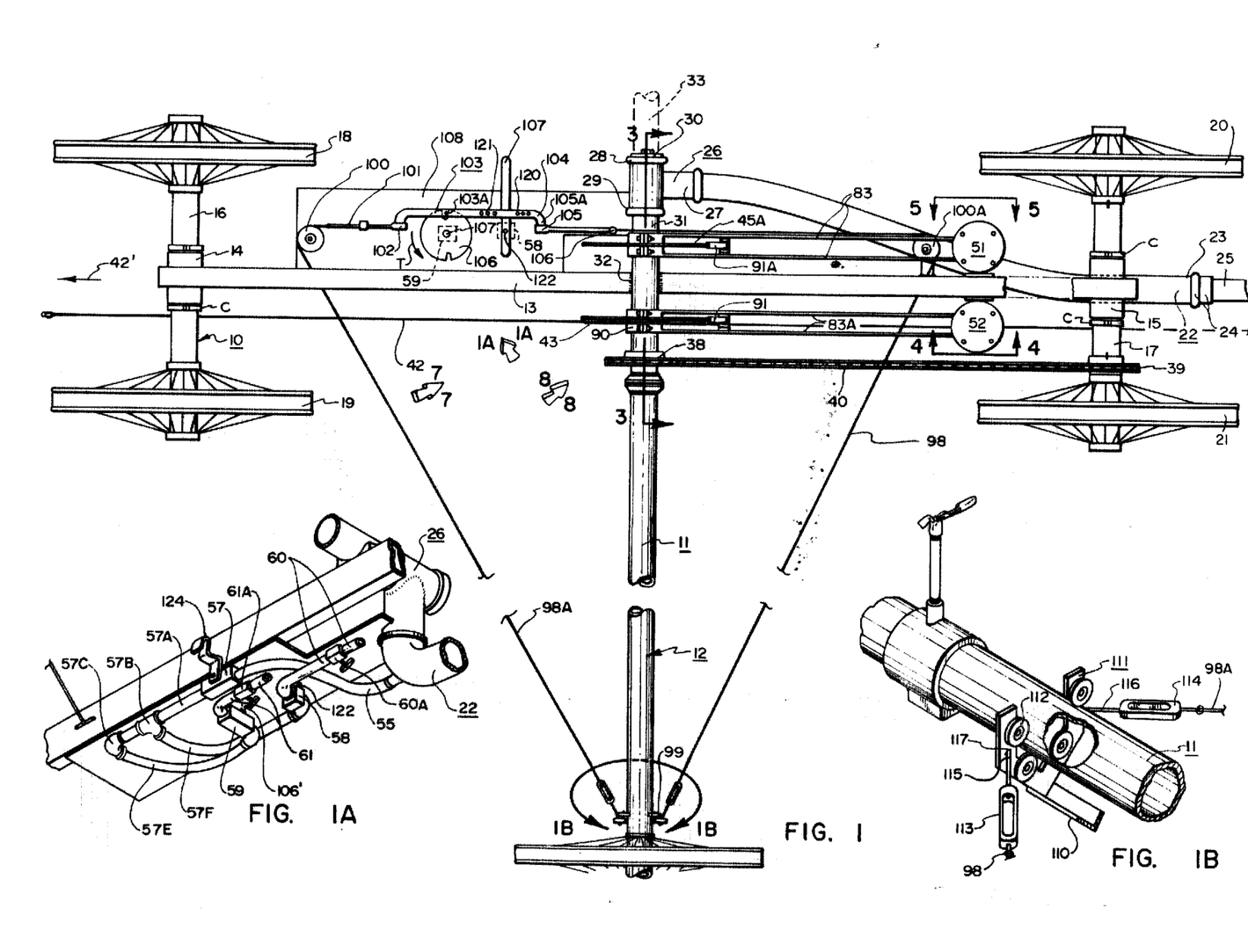
FIG. 1 is a top plan of prime mover constructed in accordance with the present invention generically shown in FIG. 9, 9B and mounted to or connected to the central water supply line of a side-roll wheel-line.
FIG. 1A is an enlarged detail in fragmentary perspective view taken along the arrow 1A in FIG. 1.
FIG. 1B is an enlarged fragmentary detail, shown in perspective, and is generally taken along the arcuate line 1B—1B in FIG. 1.
Figure 3:
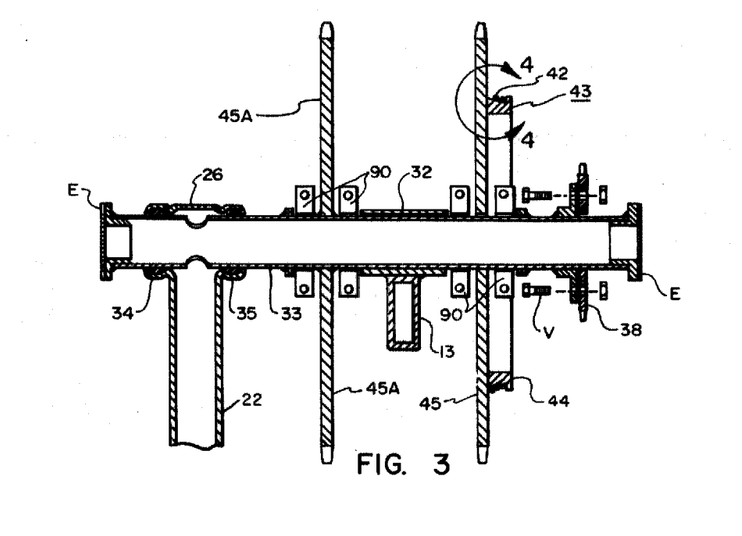
FIG. 3 is an enlarged fragmentary detail, principally in section, and taken along the line 3—3 in FIG. 2.

In FIG. 1 the prime mover 10, for the lateral, sprinkler line, elongate irrigation line, or elongate central conduit 11 of the over-all, side-roll wheel-line or central conduit structure 12 provided conventional keyed wheels (FIG. 1) includes a frame or beam 13 which may be either a box beam or an I beam, merely by way of example. Beam 13 carries conventional, front and rear bearing structures 14 and 15 that interiorly receive and journal rotating axles 16 and 17. Keyed to these axles are wheels or ground contact means 18–21; retained in place by clamps C are such axles. Affixed to beam 13 by any suitable bracket and attachments is a conduit 22 having a rear extremity 23 receiving the end fitting 24 of a water input pressure line 25. It will be understood that pressure line 25 is connected to a pump or other pressured water source, and that the prime mover or vehicle 10 simply drags the line across the field during the irrigation process. Conduit 22 connects to a tee 26 at the central leg 27 thereof. The opposite extremities 28 and 29 of the tee are connected to a plug 30, or rotating stub conduit 33, and also to central conduit 11. Bushing 32 is welded or otherwise secured to the beam 13 and receives either rotating stub conduit 33 of FIG. 3, where opposite ends E can couple to opposite lengths of a wheel line, or conduit 31 of FIG. 1 of similar construction and serving as an end coupler to the wheel line. Tee 26, see FIG. 3, is therefore of the slip-coupling type and may take one of several forms, one of which is shown in FIG. 3.

Accordingly, O-rings or sealing rings 34 and 35 are disposed in annular grooves 36 and 37 of the tee. Where the prime mover accommodates the end of a line, a simple plug can be employed at 30. Where the prime mover is located at the center of a side roll wheel line, then sprinkler-provided lateral line 33 will be coupled to the tee in the manner shown. There are innumerable types of slip-couplings for both sleeves and tees which can be employed.

A power plant, not shown, using gasoline or diesel fuel, for example, may be mounted to the frame comprising I beam 13, for powering the prime mover during non-irrigation periods. In such event, sprocket 38, having uncoupling attachments, and sprocket 39 may be applied to the tubular coupler 31 and rear axle 17, with sprocket chain 40 intercoupling the two sprockets. Appropriate gearing means, not shown, will be connected to sprocket 38 so that such power plant can drive the rear axle 17. Of course, the cable 42 will be completely wrapped about the capstan 43 and the rotation of tubular conduit 31, now not being connected to the wheel line, simply produces no effect other than to complete the drive of the power plant to the rear axle 17. When the power plant is not in use and the prime mover is employed for irrigation purposes, the keying of sprocket 38 to conduit 31 will be removed or disengaged so that the rear axle 17 during irrigation periods, will not be driven. The mechanical disengagement will be such that the exterior power plant will be uncoupled from conduit 31. Thus, the intercoupling of sprockets 38 and 39, with sprocket chain 40, is strictly an optional feature, should power plant inclusion for non-irrigation transport be intended.

Figure 2:
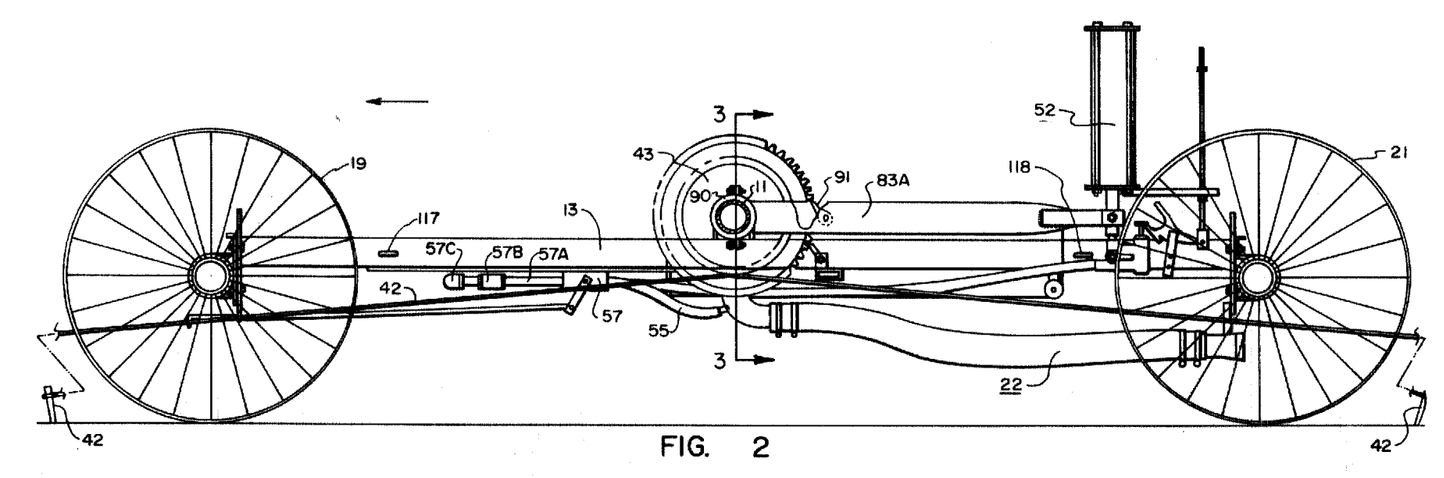
FIG. 2 is a side elevation of the prime mover structure shown in FIG. 1.

Guide cable 42 is wrapped around capstan 43 that is journaled to, and thus is free to revolve about, central conduit 31. The capstan simply can be formed by an outer flange 44 fixed to and cooperating with enlarged gear 45 provided with teeth 46. The gear 45 will comprise a ratchet wheel to cooperate with ratchet pawl 91 in a manner hereinafter explained. In returning to a consideration of the capstan 43 which will include ratchet wheel 45, the same provides for the winding of cable 42, staked at the ends of the run at 48 in FIG. 2, so that once the vehicle traverses the run intended, the stop 49 secured to cable 42 will actuate valve actuator 50 by thrusting against the same so as to turn off the water drive to cylinders 51 and 52, in a manner hereinafter described, to thereby stop the progression of the vehicle or prime mover.

FIG. 1A illustrates the main tee 26 as being turned down instead of oriented rearwardly as seen in FIG. 1. In any event, conduit 22 is the pressure conduit connection having fitting 24 connection as seen in FIG. 1.

It is important to note that tee 26, also in FIG. 1A, includes conduit 55 which connects to on-off control valve 57. Plumbing connections 57A, 57B and 57C provide connections for hydraulic conduit 57E and 57F to metering valves or control means 59 and 58. Conduits 60 and 61 lead from the valves 59 and 58 in FIG. 1A to the valving structures associated with cylinders 51 and 52, see valves 63 and 64 in FIGS. 5 and 6. The condition of valve 59 controls fluid flow to the capstan cylinder and the condition of 58 controls fluid-flow to the torquing gear or ratchet wheel 45A.

Figure 5:
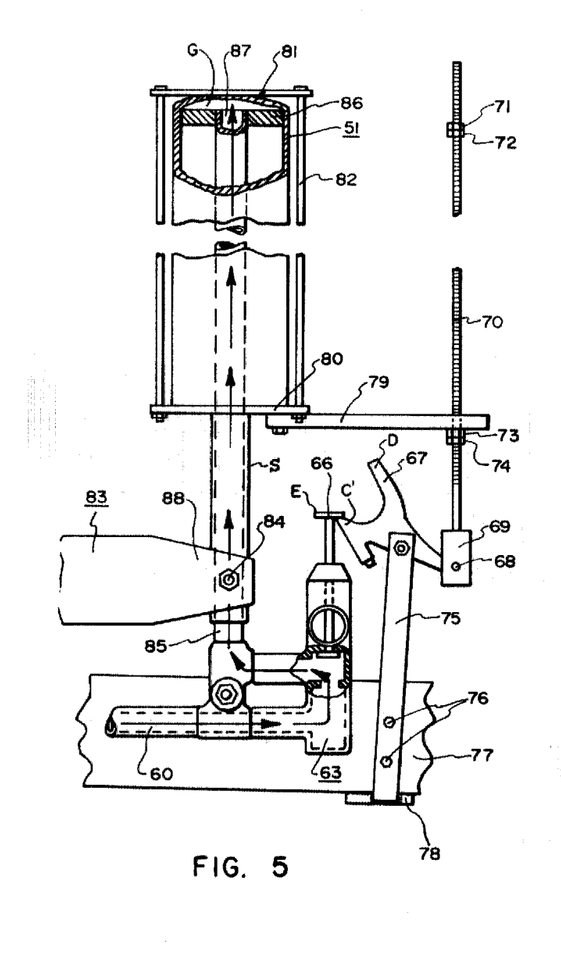
FIG. 5 is an enlarged fragmentary elevation of a representative one of the pair of hydraulic actuators employed in the invention to raise and lower the remote ends of the levers used in rotationally displacing the capstan and also the wheel line torquing gear; valve-condition and fluid flow are illustrated where the cylinder in FIG. 5 is in its retracted condition.

In the structure in FIG. 5, valve 63 includes a valve plunger 66 that is actuated by a yoke-type actuator 67 pivoted at 68 to block 69. Adjustable rod 70 carries block 69 and is provided with plural stop nuts 71, 72, and also 73, 74. Stop nuts, of course, control the movement of rod 70 in both directions. Strap 75 is bolted at 76 to I-beam frame 13 that simply extends above the ground and may include the support 78. Arm 79 is bolted or welded to plate 80 of the cylinder construction. Plates 80 and 81 are secured together by conventional cylinder rods 82. Arm 83 is pivotally connected by bolt means 84 to tubular cylinder extension S surrounding piston rod 85. Piston 86 is hollow at 87 and, in the condition shown in FIG. 5, is at its uppermost position within the downwardly disposed cylinder 51. This serves to lower the rear portion 88 of arm 83 to its lowest level. Yoke finger C' conditions valve 63 for the entrance of water, as shown by the arrow pattern in FIG. 5, to fill the chamber G above piston 86 so as to elevate the cylinder to the position shown in FIG. 6 and thus raise the associated lever arm.

It will be seen that the ratchet arm 83 thus is raised and lowered at its rearward extremity 88 so as to rotate the conduit 31 to which the ratchet arm is coupled by ratchet means hereinafter described. In operation, and assuming that there is a continual supply of water pressure at conduit 57A in FIG. 1A, then the cylinders 51 and 52 operate in a reciprocating fashion, each of said cylinders including all of the structure of FIG. 5. Accordingly, FIGS. 5 and 6 illustrate two conditions of each of the respective cylinders, and also the respective structures.

Figure 6:
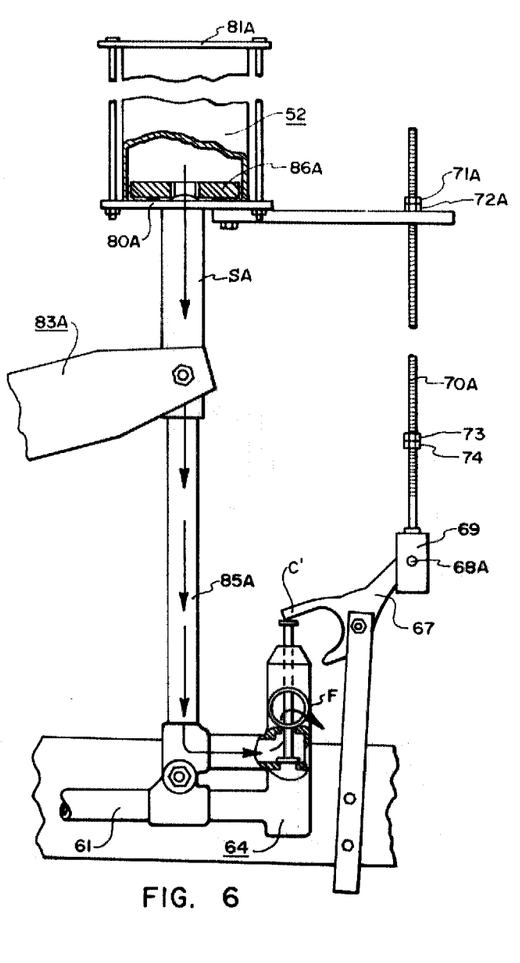
FIG. 6 is similar to FIG. 5 but illustrates the opposite corresponding cylinder upwardly extended relative to its piston rod, the valving and fluid conditions being now altered as indicated.

For convenience of illustration, the structure in FIGS. 5 and 6 have been labeled by the given numerals and by the numerals followed by an A, such being intended to indicate alternate positions of the same structure for a given cylinder and also corresponding structures for the two respective cylinders 51 and 52. Where desired, each of the cylinders may be provided with the outer sleeve S encasing each of the piston rods, as shown and previously explained.

In summary as to the operation of the structure shown in FIGS. 5 and 6, where the rearmost portion 88 of arm 83, for example, is at its lowermost point, then the valve 63 is opened in the manner indicated, by the lower finger C' of yoke actuator 67, so as to produce a fluid flow upwardly through the piston rod to a point above the piston whereby to force the cylinder 51 upwardly with respect to its piston. Accordingly, the cylinder rises and finally reaches limit stop 72, thereby pulling upwardly on the rod so as to reverse the movement of the yoke actuator 67 such that finger D descends upon the cap E of the valve element 66, thereby producing a condition shown in FIG. 6 wherein the water within the cylinder is now exhausted at F through the valve so that this waste water is simply sprayed onto the ground. This action is accompanied, of course, by a descent of the cylinder so that the piston approaches and then reaches its initial position within the cylinder as shown in FIG. 5.

Figure 7:
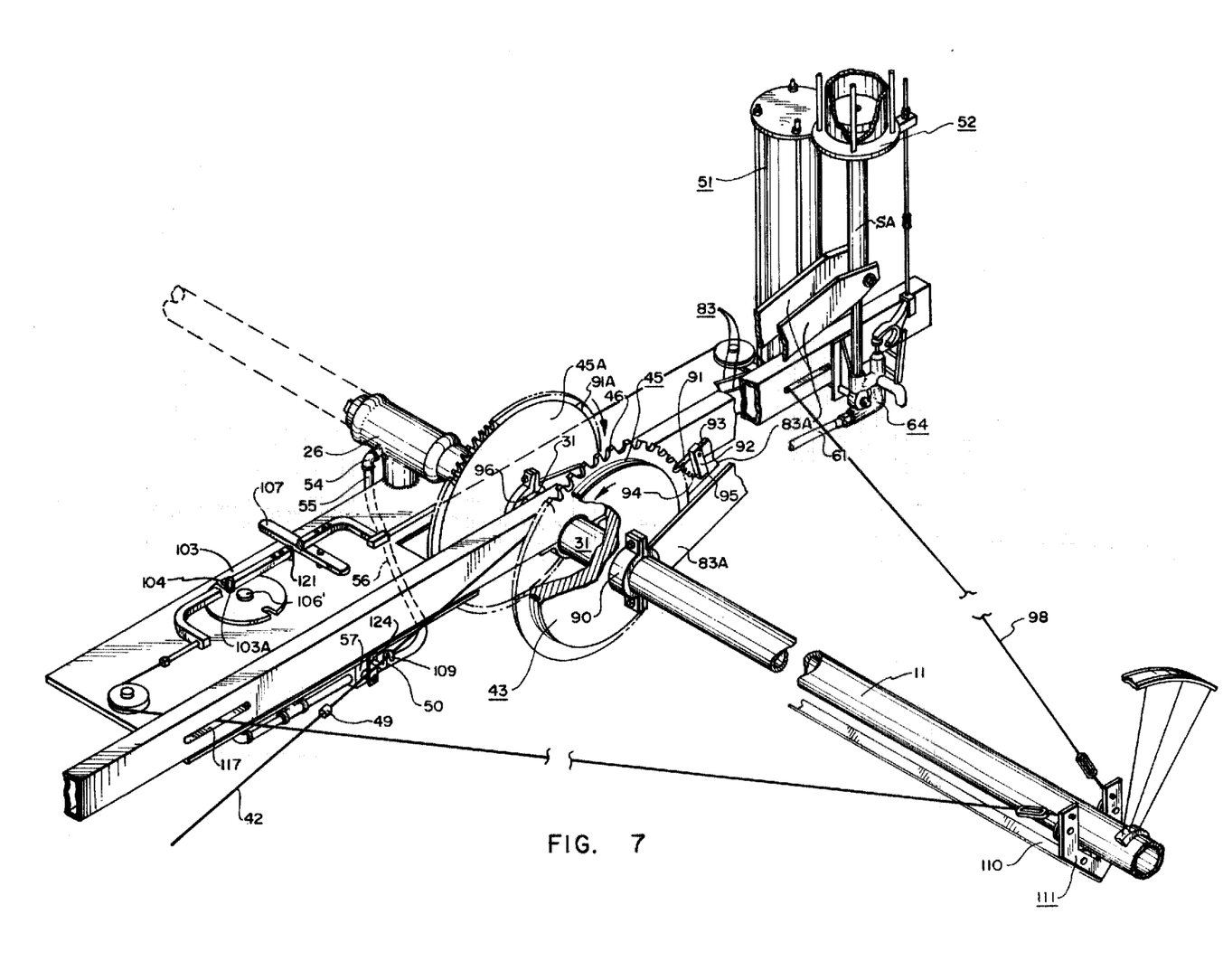
FIG. 7 is a fragmentary perspective taken along the arrow 7—7 in FIG. 1.

In FIG. 7 it is seen that the arm 83A comprises a two-arm member pivoted at opposite sides to sleeve SA associated with piston 52. The other arm 83 likewise comprises a double-arm member. In FIGS. 1, 3 and 7, a clamp-type slip-coupling 90 is applied about the central conduit 31 and is respectively affixed or welded to the ratchet arm member 83A. Arm member 83A includes a ratchet pawl 91 which is held in holder 92, being pivoted therein at 93 and also being spring-biased, via spring 94 engaging the ratchet element 91 and the arm at 95. Ratchet wheel 45 is part of the capstan 43 that is freely journaled on central conduit 31. Pawl 91A corresponds with 91.

In operation as to this part of the invention, when rear of the arm member 83A is raised then the ratchet element or pawl 91 lifts a respective tooth of ratchet wheel 45 of the capstan 43 so as to rotate ratchet wheel 45 and thus the capstan in the direction of the arrow shown in FIG. 7, such action thus tending to drag the prime mover to advance the prime mover forwardly since the capstan 43, by such ratchetting action, is periodically advanced along its cable 42. This action is produced by the action of cylinder 52 in conjunction with arm 83A and the ratchet and pawl structure hereinbefore described.

Ratchet wheel or torquing wheel 45A, however, is positively keyed to the revolving tubular conduit 31, as indicated by numeral 96 in FIG. 7. Accordingly, the up and down reciprocating action of arm 83, as produced by like pawl 91A and operation of cylinder 51, will effect a ratchetting forwardly of the ratchet wheel 45A so as to rotate tubular central conduit 31 and hence sprinkler conduit 11 of the wheel-line. The conduit 11 shall be referred to simply as the lateral sprinkler line 11.

Fixed or otherwise secured to the I-beam frame 13 is an elongate angle or bar 110 (see FIGS. 1B, 7, and 8) which includes an upstanding cradle member 111 provided with a series of rollers 112 journaled thereto. The rollers support the central conduit or lateral line 11 as shown in FIG. 1B, permitting the latter to turn within the cradle structure. A pair of turnbuckles 113 and 114 are applied to the extremities 115 and 116 which are anchored in apertures 117 of the cradle structure. Cable length 98A and cable length 98 are respectively joined to the turnbuckles and route about pulleys 100 and 100A (see FIGS. 1 and 7) after passing through frame slots 117 and 118, see also FIG. 2. Cable length 98 extends rearwardly to be connected to adjustment bolt 105 which is threaded into link end fitting 105A. Correspondingly, adjustment bolt 101 is provided to anchor the remaining end of cable length 98A. Link 103, comprising loop means with cable lengths includes a depending pin 103A that fits into slot 104 of wheel 106. Wheel 106, in turn, includes a depending shaft 106' that actuates valve 59 in FIG. 1A. Link 103 includes a series of apertures at 120 and 121 for receiving stop ends as needed. Valve 58 includes an upstanding control stem 122 which is provided with actuating handle 107. Valve 57 includes handle 124 which may be manually actuated and also actuated by the cable stop 49 which can engage the handle hook 109. Pulleys 100,100A are anchored to frame 13.

In operation, the unit is turned on by the actuation of handle 124 of valve 57, thus opening valve 57 in FIG. 1A. The handle 107 is set in the manner desired so as to set the torquing speed of the line. Handle 107, in controlling the opening of valve 58, controls the speed of rotational movement of ratchet wheel or gear 45A and hence controls the revolvement of conduit 11, 12 and the wheel-line attached to the same. Lever 107, if engaging and advancing pin 121 backwardly or counterclockwise, will likewise advance the rotation of wheel 106, owing to the engagement of the link pin 103A with slot 104 of the wheel 106.

In operation, if the wheel-line and central conduit 11 thereof are in perfect 90° relationship relative to the frame 13 of the prime mover, that is, if the capstan winding action and the revolvement of the wheel-line are tracking or are synchronized, then cable lengths 98 and 98A have equal tension, the link 103 will not move and, hence, the conditions of valves 59 and 58 in FIG. 1A will remain the same.

Assume a condition, however, where the wheel line 12 lags the prime mover relative to its forward position and is moving to the left of FIG. 1. In such event, there will exist a slack condition in cable 98 and a tensioning of cable 98A so that the link 103 in FIG. 1 will be rotated counterclockwise, this leaving the condition of lever 107 in its position so as not to disturb the torquing of the wheel-line at its present speed. A left hand advance of link 103 (see FIG. 1) will rotate wheel 106 in a counter-clockwise direction, see FIGS. 1 and 7, so that there will be a tendency of valve 59 to close, thus slowing the revolvement of the capstan and hence slowing the speed of the prime mover. See arrow T in FIG. 1.

Suppose that the reverse condition takes place, namely, where the advance of the prime mover is behind the wheel line or is moving to the left of FIG. 1, that is where the wheel line leads slightly the intended central disposition relative to the prime mover. In such event, slack will exist in cable 98A and tension exist in cable 98, thereby advancing the link 103 rearwardly. This will tend to open the valve 59 in FIG. 1A by virtue of the clockwise rotation at this time of wheel 106, thus opening the control valve 59 and speeding up capstan revolvement. Such increase in capstan revolvement speed will tend toward an increase speed of winding of cable 42 and thus an increase in the speed of advance of the prime mover forwardly so as to "catch up" to the wheel line.

Should the maximum safe capstan speed be reached and yet the prime mover is not caught up with the wheel line, then the pin 103A will simply slip out of slot 104, and pin 121 will urge the pivot lever 107 rearwardly to tend to close the valve 58 and hence lower the torquing speed of gear 45A of the wheeline, tubular central conduit 31, and the line conduit 11 of the wheel line. When such lever 107 is advanced rearwardly in a clockwise direction, see FIG. 7, then, since the torquing speed has been slowed down the linkage will gradually advance forwardly to re-engage slot 104 at a time when there is approximate alignment of the wheel line 11 with the prime mover.

Accordingly, it is seen that the capstan is in essence a "slave" to the torquing control as occasioned by lever 107 which is keyed to valve control shaft 122.

The above provision as described then takes care of situations wherein there is either a slippage of the cable on the capstan or where the cable breaks, or even where there is a cylinder malfunction which might otherwise tend to damage the equipment. Take the case of cable breakage. In such event the capstan will spin freely but the speed of the prime mover will be retarded. In such event the wheel-line 11 will be advanced forwardly relative to the prime mover so as to increase tension on cable 98 and pull the link 103 rearwardly in order to turn off valve 58 by rotational displacement in a clockwise direction of the valve arm or lever 107. Accordingly, even though the capstan may be rapidly revolving, torquing of the wheel-line can be stopped and no damage will occur. Likewise, in the event of cylinder failure relative to the capstan, then the prime mover will lag behind the wheel-line and tension in cable 98 will similarly occur.

Failure of the cylinder relative to valve 58 and torquing gear 45A causes a slight racing ahead of the prime mover relative to the wheel-line, thus tensioning cable 98A and hence slowing, if not stopping, the revolvement of the capstan.

Figure 4:
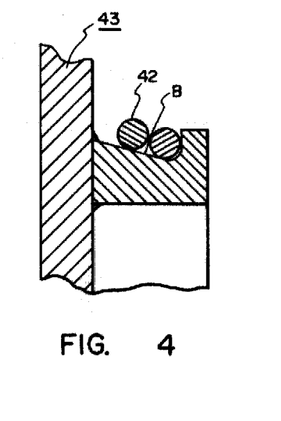
FIG. 4 is an enlarged fragmentary detail taken along the arcuate line 4—4 in FIG. 3.

As to capstan design, it is seen in FIGS. 3 and 4 that the bed B is preferably sloped so that turns of the cable 42 will not tend to catspaw or cross-over as to adjacent windings.

Figures 8, 9:
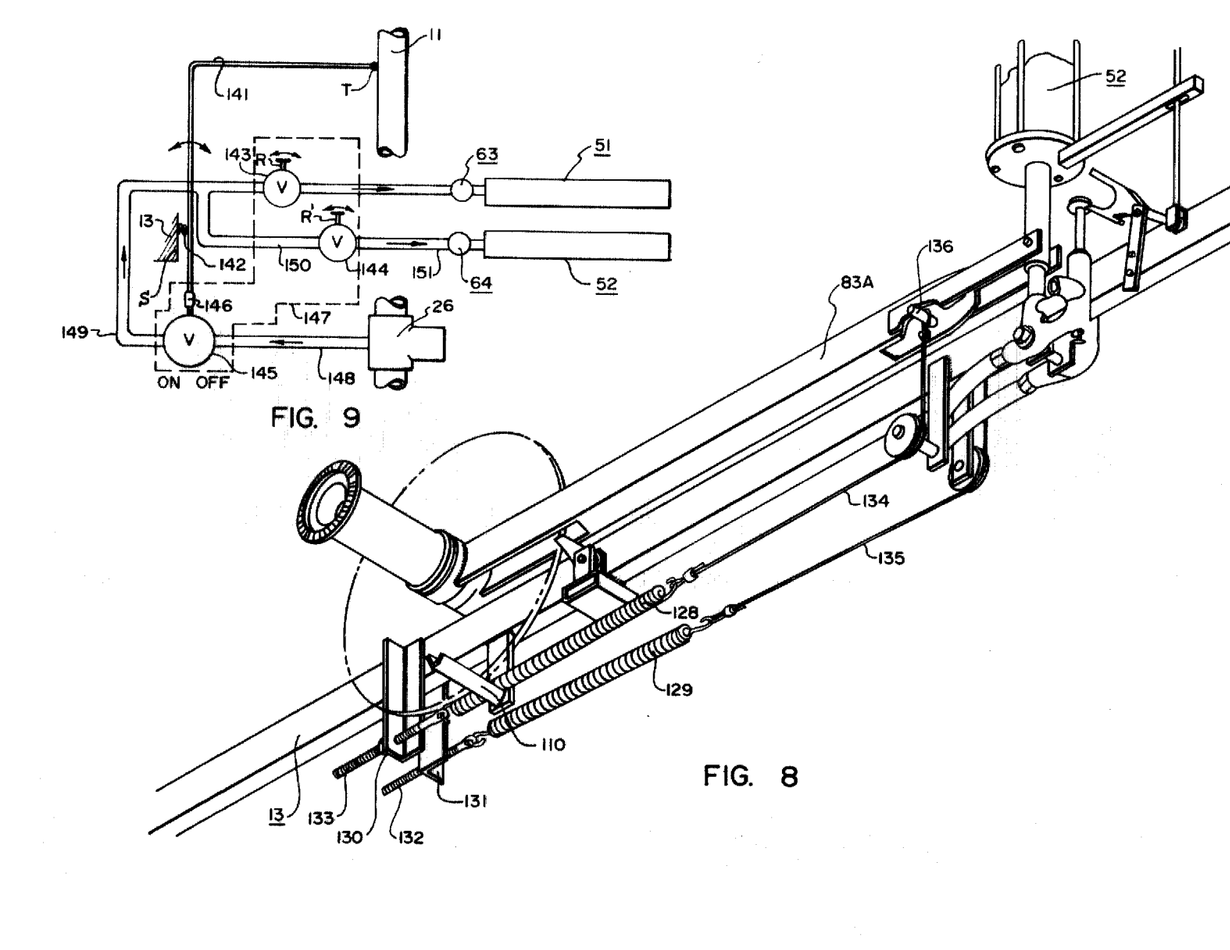
FIG. 8 is an enlarged fragmentary perspective view taken along the arrow 8—8 in FIG. 1.
FIG. 9 is a schematic diagram of the general system wherein either wheel-line deflection, or manual valve control is used to regulate wheel-line torque and capstan speed.

If desired, springs may be employed as at 128 and 129, see FIG. 8, to assist gravity in returning the respective cylinders 51 and 52. This may be accomplished by brackets 130 and 131 being welded to the frame 13, with tensioning bolts 132 and 133 being supplied for anchoring the tension springs and, likewise, cables 134 and 135 that are anchored essentially to the cylinders at respective pins 136 which are tied to the respective lever arms 83A and 83 connected to the cylinders. See FIG. 8 in this regard.

FIG. 9 illustrates the inventive general concept of having independent hydraulic means, such as hydraulic cylinders 51 and 52, and their associated structures, operate the latching structures respectively associated with the wheel-line torquing gear or wheel 45A, torquing wheel-line central coupler conduit 31, and capstan 43, respectively, of FIG. 1. Valves 143 and 144 in FIG. 9, corresponding to valves 59 and 58 in FIG. 1A, respectively, are connected via conduit 148-151, as shown in FIG. 9, to water-supply tee 26. Broadly, then, FIG. 9 illustrates that the valve means may be responsive to deflection of the wheel line, see wheel-line central conduit 11 in FIG. 9, for varying fluid flow through valves 143 and 144. This can be done manually adjusting the valve controls R and R' of valves 143, 144 to regulate fluid flow therethrough, for tracking or speed purposes, or by simply adjusting the control of the main valve 145 to control fluid flow simultaneously through valves 143 and 144. In the latter regard, deflection-sensing feeler rod may have a feeler tip T and be spring-biased against the wheel-line conduit 11 by compression spring 142, seated against portion S of frame beam 13. The rod, thus can be a fixed extension of valve control 146 to move in accordance with wheel-line deflection movement for controlling fluid-flow through valve 145. In any event, valve means 147 of whatever form, is responsive to wheel line deflection, by whatever structure, to control fluid flow through valves 143, 144 and thus, valves 63,64 to cylinders 51,52.

If desired, pressure regulator valves 60A and 61A, see FIG. 1A, may be interposed in hydraulic lines or conduit 60 and 61 leading to trip valves 63 and 64 in FIGS. 5 and 6 respectively, this so that the water pressure to such trip valves may be manually controlled and varied, as desired.

What is provided, therefore, is a new and improved prime mover for wheel lines which can be coupled either at the end of a wheel line or centrally thereof, by way of example. In fact, the prime mover may be disposed any place on the wheel line. An essential feature is that traction of the wheels is not relied upon to drag the pressure hose forwardly. Rather, a capstan is utilized for advancing the prime mover along a staked cable. Hydraulic means are supplied both for advancing the capstan and hence the prime mover relative to the cable, and also for torquing the wheel-line by the journaled conduit carried by the prime mover. Relationships between the turning movements of the capstan and the wheel-line can be varied so as to keep the prime mover in a correct position relative to the wheel-line and otherwise to straighten the line.

While particular embodiments of the invention have been shown and described, it will be obvious to those skilled in the art the various changes and modifications which may be made without departing from the essential features of the present invention and, therefore, the aim in the appended claims is to cover all such changes and modifications as fall within the true spirit and scope of the invention.

I claim:

1. In an irrigation system for irrigating an area of a field which irrigation system includes a liquid conduit supported by wheels extending over a portion of said area to be irrigated, a drive unit for supplying liquid to said conduit and for rotating said conduit and wheels, said drive unit comprising means allowing movement of said drive unit along a path, means rotatably mounting said conduit to said drive unit for rotation about a generally horizontal axis generally normal to the path of the drive unit, means for rotating said conduit, means for driving said drive unit along the path, and control means for controlling the relative speed of the drive means for said drive unit and said conduit in response to fore and aft relative displacements of said drive unit and said conduit.

2. In the irrigation system of claim 1 said drive unit further comprising a cable engaging means for engagement with a fixed cable extending along said path, means for operating said cable engaging means to move said drive unit along said cable, and wherein said control means further comprises means for controlling the relative speed of operation of said cable engaging means and said conduit in response to relative fore and aft displacement of said drive unit and said conduit.

3. In the irrigation system of claim 1 said drive unit further comprising liquid drive means for driving said drive unit and for rotating said conduit, the speed of said drive for said drive unit and the speed of rotation of said conduit being proportional to the amount of liquid fed to said liquid drive means, and means responsive to relative fore and aft displacements of said drive unit and conduit for selectively varying the amount of liquid supplied to said liquid drive means.

4. In the irrigation system of claim 1 wherein said control means further comprises a linkage attached to said conduit a distance from said drive unit and having a section extending from said conduit at an angle towards said drive unit and means in response to movement of said linkage corresponding to relative fore and aft displacements of said drive unit and said conduit for selectively controlling the relative speed of said drive for said drive unit and said conduit.

5. In the irrigation system of claim 4 wherein said control means further comprises liquid drive means for driving said drive unit and for rotating said conduit at speeds proportional to the amount of liquid supplied thereto, and means in response to movement of said linkage for selectively varying the amount of liquid supplied to said liquid drive means.

6. In the irrigation system of claim 3, said control means further comprising a first liquid drive means for driving said drive unit, a first valve means having actuator means for varying the amount of liquid supplied to said first liquid drive means, the speed of said first drive means being proportional to the amount of liquid supplied thereto, and means responsive to movement of said linkage for actuating said actuating means of said first valve means to move said first valve means in the open direction an amount proportional to linkage movement as said linkage moves in response to movement of said drive unit to a position behind said conduit and to move said first valve means in the closed direction an amount proportional to linkage movement as said linkage moves in response to movement of said drive unit to a position ahead of said conduit.

7. In the irrigation system of claim 6, said control means further comprising a second liquid drive means for imparting rotation to said conduit, the speed of said second drive means being proportional to the amount of liquid supplied thereto, and means responsive to movement of said linkage for reducing the amount of liquid to said second liquid drive means as said linkage moves in response to movement of said drive unit relative to said conduit a predetermined amount.

8. In the irrigation system of claim 7, said control means further comprising means for shutting off the supply of liquid to said first and second liquid drive means.

9. In the irrigation system of claim 4 wherein said drive unit is located between an end of said conduit and further comprising linkages attached to said conduit a distance from a side of said drive unit and extending from said conduit at an angle toward said drive unit.

10. In the irrigation system of claim 1 wherein said control means further comprises means in response to displacement of said drive unit to a position behind said conduit for increasing the speed of said drive unit relative to the speed of rotation of said conduit, and means in response to displacement of said drive unit to a position ahead of said conduit for decreasing the speed of said drive unit relative to the speed of rotation of said conduit.

11. In the irrigation system of claim 10 said control means further comprising means in response to a predetermined displacement of said drive unit relative to said conduit for decreasing the speed of rotation of said conduit.

12. In the irrigation system of claim 1 wherein said means for rotating said conduit comprises a rotatably mounted sprocket, a radial arm swingably mounted about an axis parallel to that of the sprocket, means reciprocating said arm for pivotal movement about its axis, and means imparting rotation to said sprocket in one direction in response to reciprocating movement of said arm.

13. In an irrigation system for irrigating an area of a field which irrigation system includes a liquid conduit supported by wheels extending over a portion of said area to be irrigated, a drive unit for supplying liquid to said conduit and for rotating said conduit and wheels, said drive unit comprising means allowing movement of said drive unit along a path, means rotatably mounting said conduit to said drive unit for rotation about a generally horizontal axis generally normal to the path of the drive unit, means for rotating said conduit, means for driving said drive unit along the path, and control means for controlling the relative speed of the drive means for said drive unit and said conduit in response to fore and aft relative displacement of said drive unit and said conduit, and wherein said control means further comprises a closed loop linkage attached to said conduit a distance from said drive unit, a portion of said linkage being of flexible cable, and means in response to movement of said flexible portion of said cable in the direction of its length corresponding to relative fore and aft displacement of said drive unit and said conduit for selectively controlling the relative speed of said drive for said drive unit and said conduit.

14. In the irrigation system of claim 13 wherein said control means further comprises liquid drive means for driving said drive unit and for rotating said conduit at speeds proportional to the amount of liquid supplied thereto, and means in response to movement of said closed loop linkage means for selectively varying the amount of liquid supplied to said liquid drive means.

15. In the irrigation system of claim 13 wherein said drive means for said drive unit and said means for rotating said conduit each comprise a rotatably mounted sprocket, a radial arm rotatably mounted about an axis parallel to that of the sprocket, means reciprocating said arm for pivotal movement about its axis, and means imparting rotation to said sprocket in one direction in response to reciprocating movement of said arm.

16. In the irrigation system of claim 15, said control means further comprising means for varying the speed of reciprocation of said arm in said drive means for said drive unit in response to fore and aft relative displacement of said drive unit and said conduit.

17. In the irrigation system of claim 13 said drive unit further comprising a rotatably mounted capstan for engagement with a fixed cable extending along said path whereby rotation of said capstan moves said drive unit along said cable, and wherein said drive means for said drive unit further comprises means for rotating said capstan, and wherein said control means further comprises means for controlling the relative speed of rotation of said capstan and said conduit in response to relative for and aft displacement of said drive unit and said conduit.

18. An agricultural irrigation system including, in combination, an elongate irrigation line provided with spaced, supporting, keyed wheels, first means for translating said irrigation line in a direction transverse to said line, second means coupled to said line for applying mechanical torque to said line, and third means responsive to irrigation line deflection for automatically adjusting at least one of said first and second means to vary the ratio of the speed of revolvement of said irrigation line to the speed of translation of said irrigation line, whereby to tend to correct said deflection.

19. In an irrigation system having an elongate, wheel-supported irrigation line constructed for movement over a field in a direction transverse to said wheel line: first structure coupled to said irrigation line for translating said irrigation line over said field, first means for applying torque to said irrigation line, and second means coupled to said first structure and said first means and responsive to irrigation line deflection for varying the ratio between the translational speed of said irrigation line to the speed of revolvement of said irrigation line, whereby to tend to correct such deflection.

20. A unit for torquing and also translating an agricultural wheel line, said unit including, in combination, a frame; ground-contact means for supporting said frame; first means for propelling said frame in an intended, translational direction; second means constructed for coupling to said agricultural wheel line, to apply torque thereto for revolving said wheel line; and third means responsive to wheel line deflection for automatically adjusting the ratio of the speed of frame translation to the speed of wheel line revolvement by said second means, whereby to tend to correct said deflection.

21. The structure of claim 20 wherein said first means comprises a cable-wound capstan carried by said frame, hydraulic coupling means for operative coupling to a water-pressure conduit, and first power means interposed between said hydraulic coupling means and said capstan for revolving the latter, whereby to advance the same along its cable.

22. The structure of claim 20 wherein said frame is provided with and carries a rotatable conduit constructed for connection to said wheel line, torquing gear means for rotating said conduit, and means for rotating said torquing gear means and comprising at least a portion of said second means.

23. The combination of claim 20 wherein said third means comprises control means for varying said speed ratio and loop means coupled to said control means and coacting with and responsive to wheel line deflection for actuating said control means.

24. For moving an agricultural wheel line including an elongate, central irrigation line and wheels mutually spaced along and keyed to said wheel line, in combination, structure comprising a frame, said frame being provided with ground-support means for enabling said frame to be translated, torquing gear means carried by and journaled, with respect to said frame, for applying torque to said central irrigation line; torque-drive means for rotating said torquing gear means; propulsion means for translationally propelling said frame; and means responsive to irrigation line deflection for automatically adjusting at least one of said torque drive means and said propulsion means for varying the ratio of the speed of said torquing gear means relative to the translational speed to said frame, whereby to tend to correct such deflection.

25. The structure of claim 24 wherein said torque drive means comprises a first reciprocating hydraulic jack provided with a first pivotally-reciprocating ratcheting-lever means for successively rotationally advancing said torquing gear means, said propulsion means comprising a second reciprocating hydraulic jack carried by said frame and provided with a second pivotally reciprocating, ratcheting lever means for successively propelling said frame forwardly.

26. The structure of claim 25 wherein said frame carries a capstan wound with a cable having opposite ends constructed for ground anchoring at opposite ends of the intended course, said capstan carrying capstan gear means operatively intercoupled with said second, pivotally reciprocating, ratcheting lever means.

27. In combination an agricultural-irrigation wheel line, ground-supported structure coupled to said wheel line and having first means for translating said wheel line and second means for applying torque to said wheel line, and third means responsive to wheel line deflection for automatically altering the torque so applied by said second means relative to such translation effected by said first means, whereby to tend to correct such deflection.

28. An agricultural irrigation system including, in combination, an elongate irrigation line provided with spaced, supporting, keyed wheels, first means for translating said irrigation line in a direction transverse to said line, second means coupled to said line for applying mechanical torque to said line, and third means responsive to irrigation line deflection for automatically adjusting at least one of said first and second means to vary the ratio of the speed of revolvement of said irrigation line proximate said first means to the speed of translation of said irrigation line proximate said second means, whereby to tend to correct said deflection.

29. In an irrigation system for irrigating an area of a field which irrigation system includes a liquid conduit supported by wheels extending over a portion of said area to be irrigated, a drive unit for supplying liquid to said conduit and for rotating said conduit and wheels, said drive unit comprising: means allowing movement of said drive unit along a path, means rotatably mounting said conduit to said drive unit for rotation about a generally horizontal axis generally normal to the path of the drive unit, a first liquid drive means for driving said drive unit along the path, a second liquid drive means for imparting rotation to said pipe, and control means for controlling the relative speed of the first and second liquid drive means in response to fore and aft relative displacement of said drive unit and said conduit, and wherein said control means further comprises: a closed loop linkage attached to said conduit a distance from said drive unit, a portion of said linkage being of flexible cable, a first valve means having actuator means for varying the amount of liquid supplied to said first liquid drive means, the speed of said first drive means being proportional to the amount of liquid supplied thereto, and means responsive to movement of said closed loop linkage means for actuating said actuating means of said first valve means to move said first valve means in the open direction an amount proportional to linkage movement as said linkage moves in response to movement of said drive unit to a position behind said conduit and to move said first valve means in a closed direction an amount proportional to linkage movement as said linkage moves in response to movement of said drive unit to a position ahead of said conduit, and a second valve means having actuator means for varying the amount of liquid supplied to said second liquid drive means, the speed of said second drive means being proportional to the amount of liquid supplied thereto, and means responsive to movement of said closed loop linkage means for actuating said actuating means of said second valve means to move said second valve means in a closed direction as said linkage moves in response to movement of said drive unit to a position behind said conduit a predetermined amount, whereby the speeds of both the drive unit and conduit are regulated to maintain proper alignment as both the drive unit and conduit continue their movement along the area of the field being irrigated.

30. In the irrigation system of claim 29, said control means further comprising a third valve means having actuator means for varying the amount of liquid supplied to said first and second liquid drive means, and means to actuate said actuating means of said third valve means to close said third valve means at a predetermined location of said drive unit along said path.

31. In the irrigation system of claim 29, wherein said control means further comprises a rigid link in said flexible cable portion for movement therewith, and means for selectively positioning said link in engagement with the actuator means of said first and second valve means to select the direction of control of said valve means depending on the direction of travel of said irrigation system.

32. In the irrigation system of claim 31 further comprising means providing positioning of said link out of engagement with said actuator means of said first and second valve means allowing manual operation of said actuator means.

33. In an irrigation system for irrigating an area of a field which irrigation system includes a liquid conduit supported by wheels extending over a portion of said area to be irrigated, a drive unit for supplying liquid to said conduit and for rotating said conduit and wheels, said drive unit comprising: means allowing movement of said drive unit along a path, means rotatably mounting said conduit to said drive unit for rotation about a generally horizontal axis generally normal to the path of the drive unit, first drive means for driving said drive unit along the path, second drive means for imparting rotation to said conduit, and control means for controlling the relative speed of the first and second drive means in response to fore and aft relative displacement of said drive unit and said conduit, and wherein said control means further comprises: means for varying the speed of at least one of said first and second drive means to increase the relative speed of said drive unit in response to movement of said drive unit to a position behind said conduit and to decrease the relative speed of said drive unit in response to movement of said drive unit to a position ahead of said conduit, and means for varying the speed of the other of said first and second drive means to decrease the relative speed of said conduit in response to movement of said drive unit to a position behind said conduit a predetermined amount, whereby the speeds of both the first and second drive means are regulated to maintain proper alignment of the drive unit and conduit as both the drive unit and conduit continue their movement along the area of the field being irrigated.

34. In the irrigation system of claim 33 said control means further comprising means for stopping said drive unit and the rotation of said conduit at a predetermined location of said drive unit along said path.

35. In the irrigation system of claim 33 wherein said control means further comprises means for increasing the speed of said first drive means in response to movement of said drive unit to a position behind said conduit and for decreasing of speed of said first drive means in response to movement of said drive unit to a position ahead of said conduit, and means for decreasing the speed of said second drive means in response to movement of said drive unit to a position behind said conduit a predetermined amount.

36. In the irrigation system of claim 33 wherein said control means further comprises a closed loop linkage attached to said conduit a distance from said drive unit, a portion of said linkage being of flexible cable, the speeds of said first and second drive means being controlled in response to movement of said flexible portion of said cable in the direction of its length corresponding to relative fore and aft displacement of said drive unit and said conduit.

37. In an irrigation system for irrigating an area of a field which irrigation system includes a liquid conduit supported by wheels extending over a portion of said area to be irrigated, a drive unit for supplying liquid to said conduit and for rotating said conduit and wheels, said drive unit comprising a frame, wheels rotatably mounted on said frame for supporting said frame above the ground and for movement along a path, means rotatably mounting said conduit to said drive unit frame for rotation about a generally horizontal axis generally normal to the path of the drive unit, a first sprocket concentrically secured to said conduit for rotation therewith, a first radial arm secured at one end for rotation about said axis of said conduit and first sprocket, a first liquid drive means mounted between said frame and the other end of said first arm to impart an oscillating pivotal movement to said first arm, pawl means pivotally mounted to said first arm, and frame and selectively engaging the teeth of said first sprocket for imparting rotation to said first sprocket in response to pivotal movement of said first arm in one direction and for preventing reverse rotation of said first sprocket upon pivotal movement of said first arm in the opposite direction, the frequency of said oscillations of said first arm being proportional to the amount of liquid supplied to said first liquid drive means, a capstan rotatably mounted to said frame about an axis generally parallel to the axis of said conduit for engagement with a fixed cable extending along said path of movement, whereby rotation of said capstan moves said drive unit along said cable and said path, a second sprocket concentrically secured to said capstan for rotation therewith, a second radial arm secured at one end for rotation about the axis of said capstan and second sprocket, a second liquid drive means mounted between said frame and said second arm to impart an oscillating pivotal movement to said second arm, pawl means pivotally mounted to said second arm and frame and selectively engaging the teeth of said second sprocket for imparting rotation to said second sprocket in response to pivotal movement of said second arm in one direction and for preventing reverse rotation of said second sprocket upon pivotal movement of said second arm in the opposite direction, the frequency of said oscillations of said second arm being proportional to the amount of liquid supplied to said second liquid drive means, and means for controlling the rate of rotation of said second sprocket relative to said first sprocket, and hence the rate of rotation of said capstan relative to said conduit, said controlling means comprising a closed loop linkage attached to said conduit a distance from said drive unit, a first section of said linkage extending from said conduit at an angle rearwardly toward said drive unit and a second section of said linkage extending at an angle from said conduit forwardly toward said drive unit, a portion of said linkage being of flexible cable, a first liquid input means to said first liquid drive means, a second liquid input means to said second liquid drive means, a first valve means in said first liquid input means for controlling the amount of liquid fed to said first liquid drive means, a second valve means in said second liquid input means for controlling the amount of liquid fed to said second liquid drive means, said first and second valve means having valve actuating means associated therewith, means engaging said closed loop linkage means with said actuating means of said first valve means to move said first valve means in the closed direction as said linkage means moves in response to movement of said drive unit to a position behind said conduit a predetermined amount, and means engaging said closed loop linkage means with said actuating means of said second valve means to move said second valve means in the open direction an amount proportional to linkage movement as said linkage moves in response to movement of said drive unit to a position behind said conduit and to move said second valve means in the closed direction an amount proportional to linkage movement as said linkage moves in response to forward movement of said drive unit to a position ahead of said conduit.

38. In the irrigation system of claim 37 wherein said drive unit further comprises a third valve means in both liquid input means and having actuating means for opening and closing said third valve means, and means connected to said actuator means of said third valve means for closing said third valve means at a predetermined location of said drive unit along said cable.

39. In an irrigation system for irrigating an area of a field which irrigation system includes a liquid conduit supported by wheels extending over a portion of said area to be irrigated, a drive unit for supplying liquid to said conduit and for rotating said conduit and wheels, said drive unit comprising: means allowing movement of said drive unit along a path, means rotatably mounting said conduit to said drive unit for rotation about a generally horizontal axis generally normal to the path of the drive unit, means for rotating said conduit, means for driving said drive unit along the path, and control means for controlling the relative speed of the drive means for said drive unit and said conduit in response to fore and aft relative displacement of said drive unit and said conduit, and wherein said control means further comprises a closed loop linkage attached to said conduit a distance from said drive unit, a portion of said linkage being of flexible cable, a rigid link in the flexible cable portion of the closed loop linkage for movement therewith, and means engaging said link and responsive to movement thereof corresponding to relative fore and aft displacement of said drive unit and said conduit for selectively controlling the relative speed for said drive unit and said conduit.

40. In the irrigation system of claim 39 further comprising means providing selective positioning of said link for selecting the direction of control depending on the direction of travel of said irrigation system.

41. In an irrigation system for irrigating an area of a field which irrigation system includes a liquid conduit supported by wheels extending over a portion of said area to be irrigated, a drive unit for supplying liquid to said conduit and for rotating said conduit and wheels, said drive unit comprising means allowing movement of said drive unit along a path, means rotatably mounting said conduit to said drive unit for rotation about a generally horizontal axis generally normal to the path of the drive unit, means for rotating said conduit, means for driving said drive unit along the path, and control means for controlling the relative speed of the drive means for said drive unit and said conduit in response to fore and aft relative displacement of said drive unit and said conduit, said controlling means further comprising a linkage attached to said conduit a distance from said drive unit, a first section of said linkage extending from said conduit at an angle rearwardly toward said drive unit and a second section of said linkage extending at an angle from the same side of the conduit forwardly toward said drive unit, and means in response to movement of said linkage corresponding to relative fore and aft displacement of said drive unit and said conduit for selectively controlling the relative speed of said drive for said drive unit and said conduit.

42. In an irrigation system of claim 41 wherein said drive unit is located at the end of said conduit.

43. In the irrigation system of claim 41 wherein said linkage is a closed loop linkage having a flexible cable portion which moves in the direction of its length in response to relative fore and aft displacement of said drive unit and conduit.

* * * * *